United States Patent
Moore et al.

(10) Patent No.: US 9,174,602 B1
(45) Date of Patent: Nov. 3, 2015

(54) SIDE PILLAR ASSEMBLIES WITH MULTI-SURFACE RETENTION STRUCTURES FOR SIDE AIRBAGS

(71) Applicant: Toyota Motor Engineering & Manufacturing North America, Inc., Erlanger, KY (US)

(72) Inventors: Jaime N. Moore, Ann Arbor, MI (US); Daniel F. Gillay, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/538,875

(22) Filed: Nov. 12, 2014

(51) Int. Cl.
| | |
|---|---|
| *B60R 21/213* | (2011.01) |
| *B60R 21/232* | (2011.01) |
| *B60R 21/215* | (2011.01) |
| *B62D 25/04* | (2006.01) |
| *B60R 21/231* | (2011.01) |

(52) U.S. Cl.
CPC ............. *B60R 21/213* (2013.01); *B60R 21/215* (2013.01); *B60R 21/232* (2013.01); *B62D 25/04* (2013.01); *B60R 2021/23192* (2013.01)

(58) Field of Classification Search
USPC .......................................... 280/728.2, 730.2
See application file for complete search history.

(56) References Cited

U.S. PATENT DOCUMENTS

| | | | |
|---|---|---|---|
| 6,254,123 B1 | 7/2001 | Urushi et al. | |
| 6,305,707 B1 | 10/2001 | Ishiyama et al. | |
| 6,361,069 B1 | 3/2002 | Saito et al. | |
| 6,520,533 B2 * | 2/2003 | Tanase et al. | 280/730.2 |
| 6,530,594 B1 | 3/2003 | Nakajima et al. | |
| 6,705,636 B2 | 3/2004 | Takahara | |
| 6,796,576 B2 | 9/2004 | Aoki et al. | |
| 7,011,337 B2 * | 3/2006 | Aoki et al. | 280/730.2 |
| 7,059,629 B2 | 6/2006 | Takahara | |

(Continued)

FOREIGN PATENT DOCUMENTS

CN 103204130 7/2013

*Primary Examiner* — Toan To
(74) *Attorney, Agent, or Firm* — Dinsmore & Shohl LLP

(57) ABSTRACT

A vehicle includes a pillar garnish mounted at a side pillar assembly of the vehicle. The pillar garnish has an upper end portion, a roof head lining with an outer portion that extends along the upper end portion of the pillar garnish, and an airbag jump bracket fixedly located between a pillar body and the roof head lining. The airbag jump bracket includes a first portion extending in a vehicle height direction and a second portion extending outwardly from the first portion in a vehicle width direction. The second portion supports an airbag body that guides the airbag body toward an occupant compartment of the vehicle during an airbag deployment event. The airbag jump bracket further includes an outwardly turned flange portion that extends outwardly in the vehicle width direction to underhang the second portion of the airbag jump bracket. The outwardly turned flange portion has an underside and terminates at an end located beneath the second portion of the airbag jump bracket. The pillar garnish includes an airbag jump bracket engaging feature including a tower engaging portion and a ledge engaging portion. The ledge engaging portion includes a ledge engaging surface that engages the outwardly turned flange portion during an airbag deployment event in the vehicle height direction and the tower engaging portion includes a tower engaging surface that engages the outwardly turned flange portion during an airbag deployment event in a vehicle width direction.

20 Claims, 5 Drawing Sheets

(56) References Cited

U.S. PATENT DOCUMENTS

| | | | |
|---|---|---|---|
| 7,134,682 B2* | 11/2006 | Totsuka et al. | 280/728.2 |
| 7,219,921 B2 | 5/2007 | Noguchi | |
| 7,673,897 B2 | 3/2010 | Ochiai | |
| 7,934,748 B2* | 5/2011 | Torii | 280/730.2 |
| 7,992,892 B2* | 8/2011 | Jaramillo | 280/729 |
| 8,936,270 B2* | 1/2015 | Kurahashi | 280/730.2 |
| 8,960,715 B2* | 2/2015 | Uchida | 280/730.2 |
| 2006/0082108 A1 | 4/2006 | Wahara et al. | |

* cited by examiner

SIDE PILLAR ASSEMBLIES WITH MULTI-SURFACE RETENTION STRUCTURES FOR SIDE AIRBAGS

TECHNICAL FIELD

The present specification generally relates to side pillar assemblies in vehicles and, more particularly, to a side pillar assembly and retention structures for side airbags.

BACKGROUND

Side airbag apparatuses have been proposed in which an airbag is accommodated in a folded state at a roof side rail portion at a pillar portion, behind a roof head lining. During deployment, the airbag can release into the vehicle compartment between the roof head lining and a pillar garnish. While it can be important to provide such an airbag release location between the roof head lining and pillar garnish, it can be undesirable for the pillar garnish to extend into an occupant compartment. Further, it can be undesirable for the side airbag to expand behind the pillar garnish.

What is desired is a retention structure that can hold the pillar garnish in place, even during an airbag deployment, and direct the side airbag over the pillar garnish.

SUMMARY

In one embodiment, a vehicle includes a pillar garnish mounted at a side pillar assembly of the vehicle. The pillar garnish has an upper end portion, a roof head lining with an outer portion that extends along the upper end portion of the pillar garnish, and an airbag jump bracket fixedly located between a pillar body and the roof head lining. The airbag jump bracket includes a first portion extending in a vehicle height direction and a second portion extending outwardly from the first portion in a vehicle width direction. The second portion supports an airbag body that guides the airbag body toward an occupant compartment of the vehicle during an airbag deployment event. The airbag jump bracket further includes an outwardly turned flange portion that extends outwardly in the vehicle width direction to underhang the second portion of the airbag jump bracket. The outwardly turned flange portion terminates at an end located beneath the second portion of the airbag jump bracket. The pillar garnish includes an airbag jump bracket engaging feature including a tower engaging portion and a ledge engaging portion. The ledge engaging portion includes a ledge engaging surface that engages the outwardly turned flange portion with movement of the airbag jump bracket engaging feature in the vehicle height direction and the tower engaging portion includes a tower engaging surface that engages the outwardly turned flange portion with movement of the airbag jump bracket engaging feature in a vehicle width direction.

In another embodiment, a vehicle includes a pillar garnish mounted at a side pillar assembly of the vehicle. The pillar garnish has an upper end portion, a roof head lining having an outer portion that extends along the upper end portion of the pillar garnish, and an airbag jump bracket fixedly located between a pillar body and the roof head lining. The airbag jump bracket includes a first portion extending in a vehicle height direction and a second portion extending outwardly from the first portion in a vehicle width direction. The second portion supports an airbag body that guides the airbag body toward an occupant compartment of the vehicle during an airbag deployment event. The airbag jump bracket further includes an outwardly turned flange portion that extends outwardly in the vehicle width direction to underhang the second portion of the airbag jump bracket. The outwardly turned flange portion has an underside and terminates at an end located beneath the second portion of the airbag jump bracket. The pillar garnish further includes an airbag jump bracket engaging feature including a tower engaging portion spaced from the end of the outwardly turned flange portion no more than about 3 cm and a ledge engaging portion spaced from the underside of the outwardly turned flange portion no more than about 3 cm.

In yet another embodiment, a mounting structure is configured for use with an airbag body in a vehicle, the vehicle including an occupant compartment, a roof side rail, and a pillar assembly. The airbag body is inflatable along the roof side rail and across a pillar. The mounting structure includes a pillar garnish having an upper end portion and an airbag jump bracket. The airbag jump bracket includes a first portion extending upwardly and a second portion extending outwardly from the first portion. The second portion is configured to support the airbag body and guide the airbag body toward the occupant compartment of the vehicle during an airbag deployment event. The airbag jump bracket further includes an outwardly turned flange portion extending outwardly to underhang the second portion of the airbag jump bracket. The outwardly turned flange portion has an underside and terminates at an end located beneath the second portion of the airbag jump bracket. The pillar garnish further includes an airbag jump bracket engaging feature having a tower engaging portion and a ledge engaging portion. The ledge engaging portion includes a ledge engaging surface that engages the outwardly turned flange portion during an airbag deployment event in a vehicle height direction and the tower engaging portion includes a tower engaging surface that engages the outwardly turned flange portion during the airbag deployment event in a vehicle widthwise direction to inhibit movement of the pillar garnish during the airbag deployment event.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to side pillar assemblies and retention structures for use with side airbag apparatuses. The side airbag apparatuses include a side airbag that is located at the side pillar assembly, behind a roof head lining. The side airbag may be, for example, a curtain shield airbag (CSA) that may be deployed in response to one or more sensors detecting a side impact or rollover event. A jump bracket may be provided that supports the airbag thereon. The jump bracket may be sized and shaped not only to support the airbag, but also to provide some directional support for the airbag during a deployment event to guide the airbag toward an occupant compartment in a predictable fashion. During deployment, the airbag can deploy from behind the roof head lining, above one or more pillar garnishes of the side pillar assembly and into the occupant compartment. In some embodiments, the pillar can be any one or more of the A, B, C, or D pillars. Because the airbag deploys in the vicinity of the one or more pillar garnishes, it is desirable to control (e.g., limit) movement of the one or more pillar garnishes during a deployment event and it may be desirable to limit movement of the pillar garnish into the occupant compartment, even during non-deployment of the airbag to prevent a gap forming between the head lining and the pillar. Additionally, it may be desirable to control (e.g., limit) movement of the airbag jump bracket during a deployment event, for example, limiting motion of the airbag jump bracket in a vehicle height direction to direct the curtain shield airbag beyond an upper portion of the pillar garnish and prevent the airbag jump bracket from directing the curtain shield airbag between the inner rail panel and the pillar garnish.

An arrow FR of the Figures indicates the forward direction of a vehicle, an arrow UP indicates the upward direction thereof.

Figure 1:
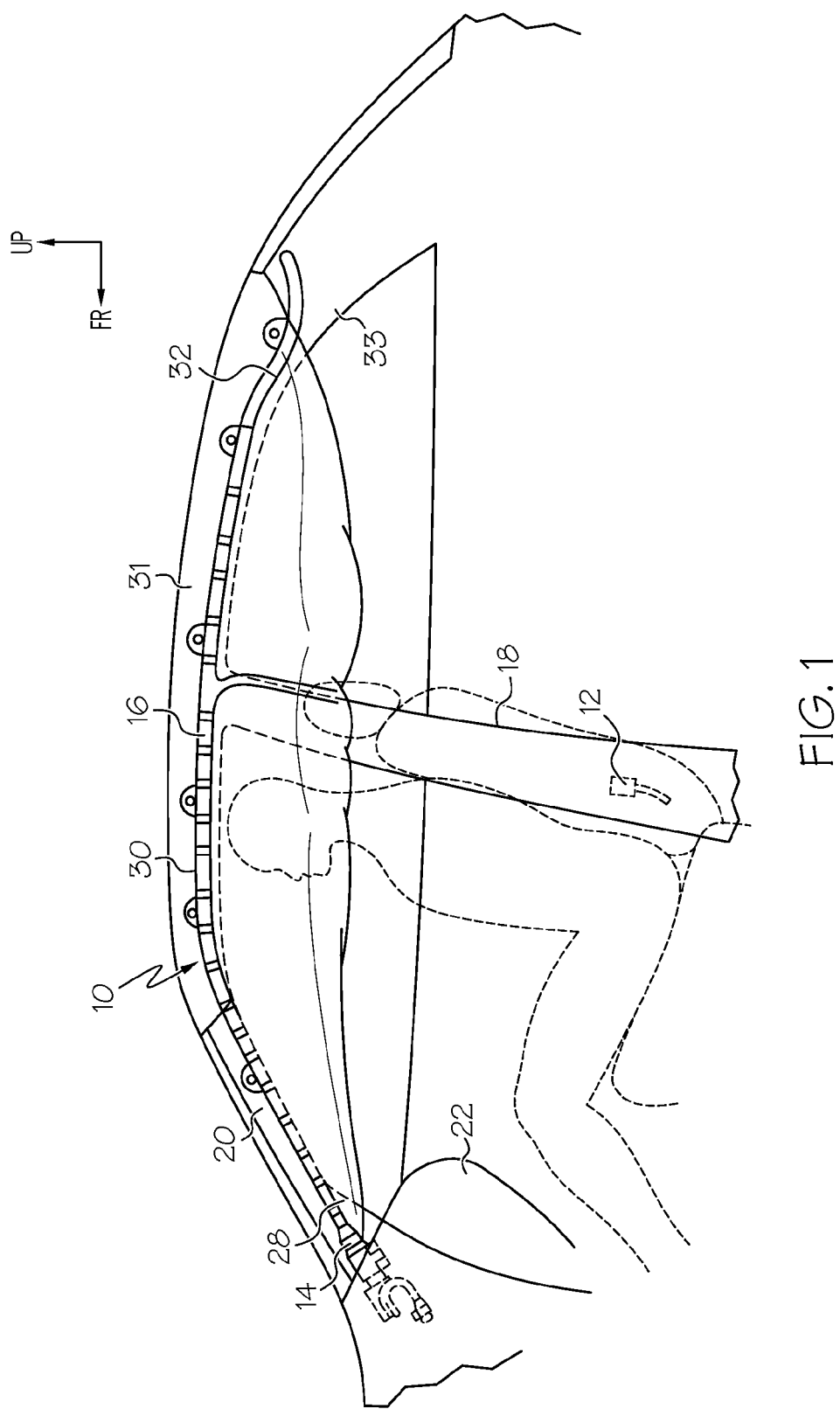
FIG. 1 is a schematic side view of a vehicle showing a state where an airbag body is deployed according to one or more embodiments described herein.

As shown in FIG. 1, a side airbag apparatus 10 comprises a sensor 12 for detecting a side collision and/or rollover event, a cylindrical inflator 14 which injects gas when it is activated, and an airbag body 16. FIG. 1 depicts an illustrative vehicle having an A pillar 20, a B pillar 18, and a C pillar 33. It should be understood that a vehicle having any pillar arrangement is contemplated, such as one having additional pillars. The sensor 12 may be integrated in the airbag ECU and can be disposed near a bottom end portion of the B pillar 18 or any other suitable location to detect a side collision and/or rollover event when applied to the vehicle. In some embodiments, multiple sensors may be used at the same or different locations. The inflator 14 can be disposed near a joint portion between the A pillar 20 and a dashboard 22 and connected to the sensor 12. In other embodiments, the inflator may be located at the pillar of the vehicle or any other suitable location. If the sensor 12 detects a side collision and/or rollover event, the inflator 14 can be actuated to inflate the airbag body 16.

Figure 2:
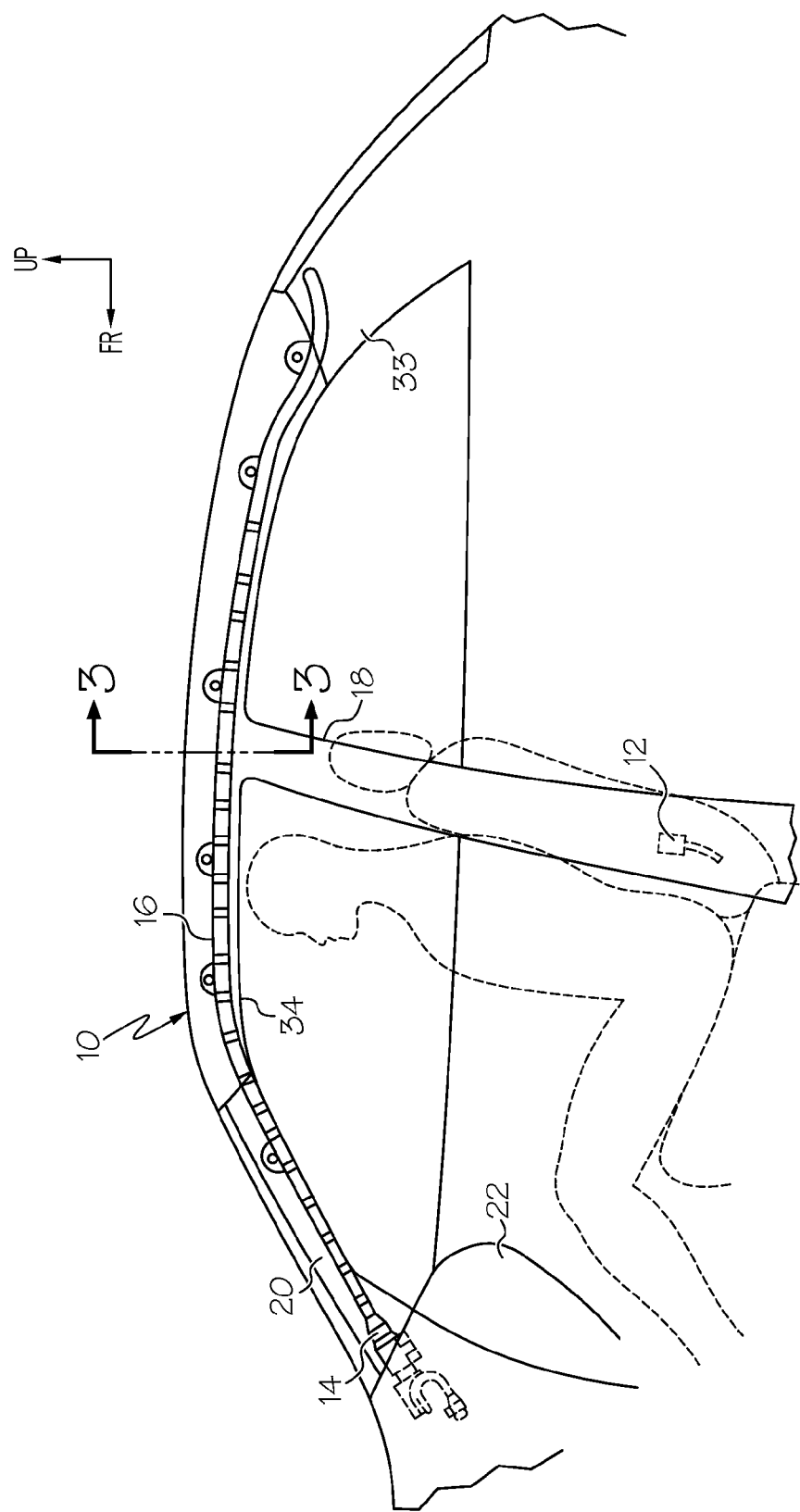
FIG. 2 is another schematic view of the vehicle of FIG. 1 with the airbag body is a stored configuration according to one or more embodiments described herein.

A front end portion 28 of the airbag body 16 may be disposed at a position where the inflator 14 is disposed such that gas injected from the inflator 14 flows therein. A top edge portion of a middle portion 30 of the airbag body 16 may be disposed along the B pillar 18 and a roof side rail 31. A rear end portion 32 may be disposed near the C pillar (e.g., quarter pillar) 33. As shown in FIG. 2, the airbag body 16 may be formed into an elongated, tube-like body by being folded, and may be accommodated over the front and central pillar garnishes and behind the roof head lining 34.

Figure 3:
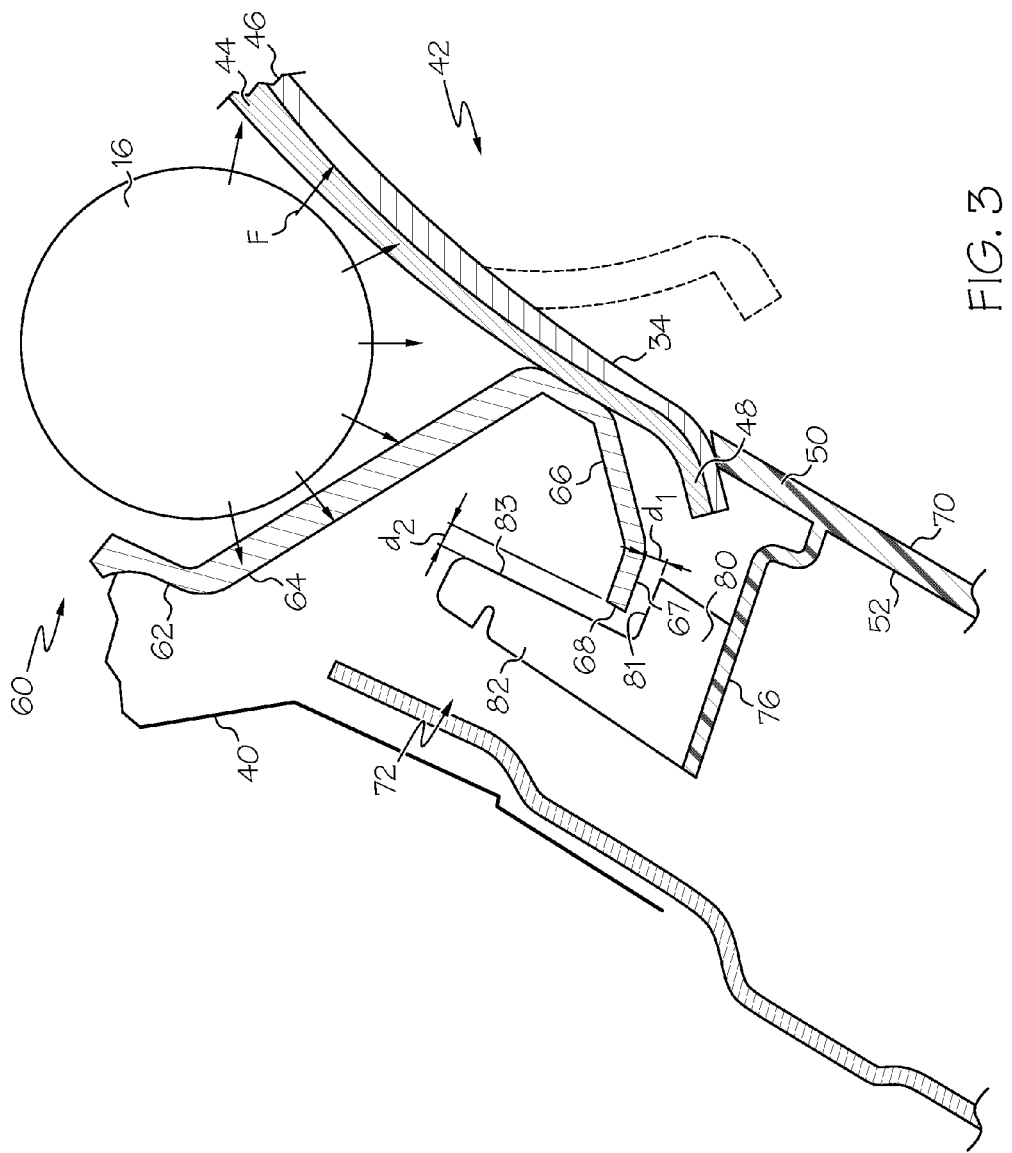
FIG. 3 is a schematic section view along line 3-3 of FIG. 2 according to one or more embodiments described herein.

Referring to FIG. 3, the airbag body 16 may be located between an inner rail panel 40 and a vehicle transverse outer portion 42 of the roof head lining 34. While FIG. 3 depicts an exemplary embodiment of the present disclosure located at the B pillar 18, it should be understood that the embodiments depicted in FIG. 3 can be positioned at any one or more of the pillars of the vehicle, for example, the A pillar 20, the C pillar 33 or, in other vehicle arrangements, a D pillar, and the like. The roof head lining 34 may be made of resin and include a base material layer 44 and a surface skin layer 46. When the airbag body 16 inflates, the vehicle transverse outer portion 42 of the roof head lining 34 is opened inwards into the vehicle occupant compartment by an expanding inflation force of the airbag body 16 as indicated by dash line of FIG. 3 so that the airbag body 16 inflates in a vehicle occupant compartment inner direction through the gap thus formed. An edge portion 48 of the roof head lining 34 engages an upper end portion 50 of pillar garnish 52. When the airbag body 16 is expanded, the engagement between the edge portion 48 of the roof head lining 34 and the upper end portion 50 of the pillar garnish 52 is released by an inflation force of the airbag body 16.

An airbag jump bracket 60 is fixedly disposed as an airbag body directing structure below the airbag body 16. The jump bracket 60 may be formed of any suitable material, such as molded plastic or metal. The jump bracket 60 is located within a region above the pillar garnish 52, between the roof head lining 34 and the inner rail panel 40 and includes a first portion 62 extending in the vehicle height direction and a second portion 64 extending outwardly from the first portion 62 in the vehicle width direction. In some embodiments, the first portion 62 may also bend around the airbag body 16 in the vehicle width direction. The second portion 64 supports the airbag body 16 thereon. The jump bracket 60 further includes an outwardly turned flange portion 66 extending outwardly in the vehicle width direction to underhang the second portion 64 of the jump bracket 60. The outwardly turned flange portion 66 terminates at an end 68 located beneath the second portion 64. Further, the outwardly turned flange portion 66 includes an underside 67.

Figure 4:
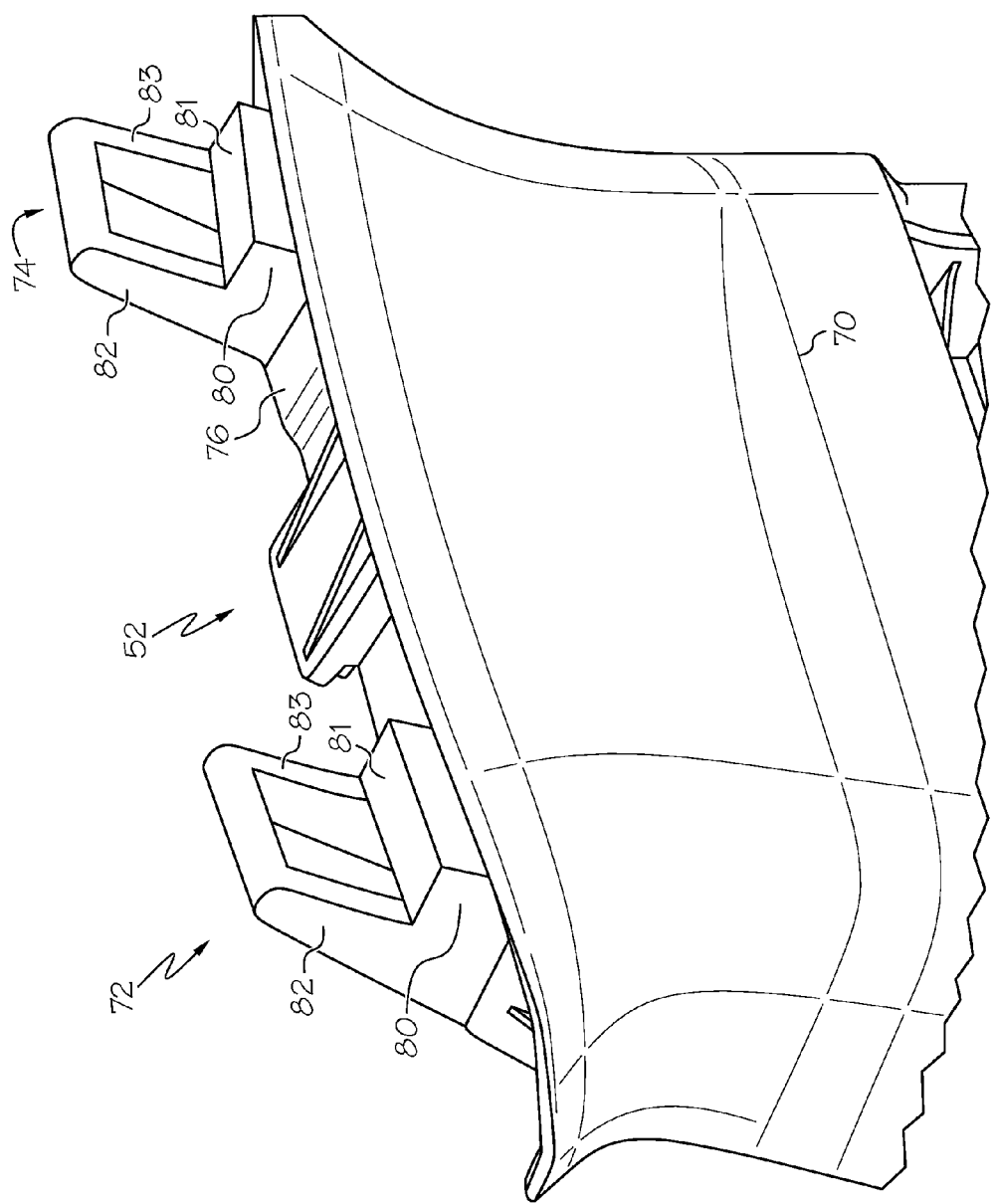
FIG. 4 is a front, perspective view of a pillar garnish according to one or more embodiments described herein.

Referring also to FIG. 4, the pillar garnish 52 may be made of plastic or any other suitable material and include multiple layers such as base material and skin layers. In some embodiments, a clip or other suitable structure may be used to fasten the pillar garnish 52 to the inner rail panel 40 and/or to a pillar panel. The pillar garnish 52 includes a covering portion 70 that extends in the vehicle height direction and a pair of jump bracket engaging features 72 and 74 (FIG. 4) that are integrally molded with the covering portion 70 providing a unitary molded structure. Each jump bracket engaging feature 72, 74 includes a base portion 76 extending outwardly from the covering portion 70 in the vehicle width direction. Each jump bracket engaging feature 72, 74 further includes a ledge engaging portion 80 and a tower engaging portion 82 each extending upwardly from the base portion 76. The tower engaging portion 82 and the ledge engaging portion 80 can be integral and the tower engaging portion 82 upwardly extends beyond the ledge engaging portion 80 in the vehicle height direction. The ledge engaging portion 80 may be positioned between the tower engaging portion 82 and the upper end portion 50 of the pillar garnish 52 in the vehicle width direction and may be positioned between the tower engaging portion 82 and the occupant compartment in the vehicle width direction.

The ledge engaging portion 80 is positioned adjacent the underside 67 of the outwardly turned flange portion 66 and the tower engaging portion 82 is positioned adjacent the end 68 of the outwardly turned flange portion 66. During an airbag deployment event, a ledge engaging surface 81 of the ledge engaging portion 80 may engage the underside 67 and a tower engaging surface 83 of the tower engaging portion 82 may engage the end 68. The tower engaging portion 82 may extend upwardly beyond the end 68 of the outwardly turned flange portion 66 of the jump bracket 60 in the vehicle height direction. Further, the ledge engaging portion 80 may coextend, extend beyond, or extend below the upper end portion 50 of the pillar garnish 52 in the vehicle height direction.

The ledge engaging portion 80 is sized and arranged to engage the outwardly turned flange portion 66 of the jump bracket 60 with small movements of the jump bracket 60 toward the ledge engaging surface 81, such as, for example, in a vehicle height direction during an airbag deployment event. However, some space is provided between the ledge engaging portion 80 and the outwardly turned flange portion 66. For example, a distance $d_1$ (which may be substantially orthogonal to distance $d_2$) from the ledge engaging portion 80 to the underside 67 of the outwardly turned flange portion 66 may be no more than about 3 cm, such as no more than about 2 cm, such as no more than about 1 cm, such as no more than about 5 mm. Further, the tower engaging portion 82 is sized and arranged to engage the outwardly turned flange portion 66 of the jump bracket 60 with small movements of the pillar garnish 52 away from the jump bracket 60, such as, for example, during an airbag deployment event. However, some space is provided between the tower engaging portion 82 and the outwardly turned flange portion 66. For example, a distance $d_2$ from the tower engaging portion 82 to the end 68 of the outwardly turned flange portion 66 may be no more than about 3 cm, such as no more than about 2 cm, such as no more than about 1 cm, such as no more than about 5 mm.

Providing some spacing between the tower engaging portion 82 and the outwardly turned flange portion 66 and providing some spacing between the ledge engaging portion 80 and the outwardly turned flange portion 66 can facilitate installation of the pillar garnish 52 behind the jump bracket 60 and roof head lining 34 and also reduce noise due to jump bracket engaging feature 72, 74 and jump bracket 60 vibration. In operation, the tower engaging portion 82 may limit movement of the upper end portion 50 of the pillar garnish 52 into the occupant compartment, for example, during an airbag deployment event. Further, the ledge engaging portion 80 may limit movement of the jump bracket 60 in a vehicle height direction such that the jump bracket 60 directs the airbag body 16 upwardly beyond the upper end portion 50 of the pillar garnish 52 and prevents the jump bracket 60 from directing the airbag body 16 between the inner rail panel 40 and the pillar garnish 52.

Figure 5:
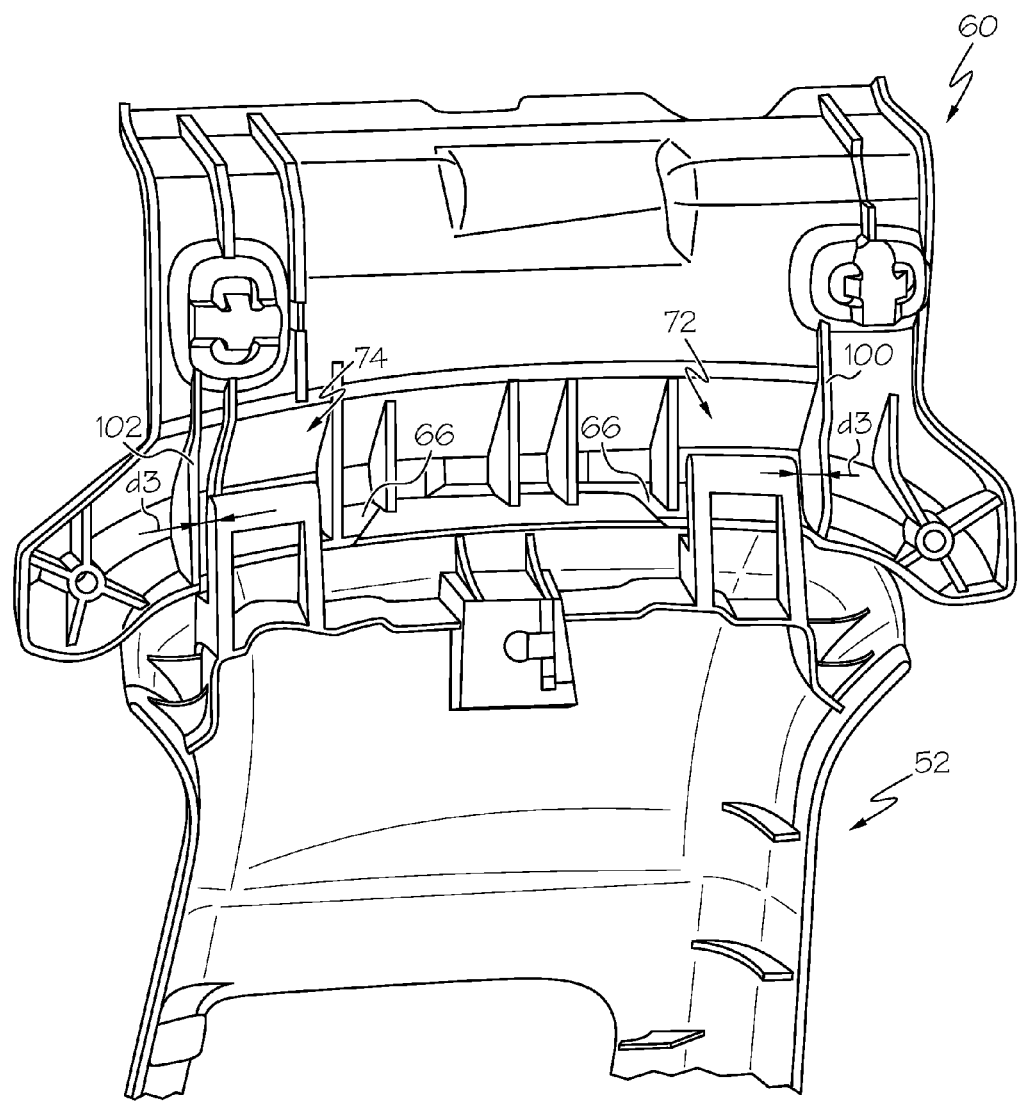
FIG. 5 is an exterior view of the pillar garnish of FIG. 4 and airbag jump bracket according to one or more embodiments described herein.

FIG. 5 illustrates an exterior view of the pillar garnish 52 assembled with the jump bracket 60. In this view, both jump bracket engaging features 72 and 74 can be seen along with the outwardly turned flange portion 66 of the jump bracket 60. It can be seen that the jump bracket engaging features 72 and 74 can also limit movement of the pillar garnish 52 in the vehicle length direction. In this embodiment, distance $d_3$ between the jump bracket engaging features 72 and 74 and jump bracket support members 100 and 102 may be limited. For example, $d_3$ may be no more than about 3 cm, such as no more than about 2 cm, such as no more than about 1 cm, such as no more than about 5 mm.

The side pillar assemblies and retention structures for side airbags described herein can facilitate installation of the pillar garnish while limiting its movement before and after an airbag deployment event in both a vehicle width direction and a vehicle height direction. Limiting movement of the pillar garnish during a deployment event can maintain the position of the pillar garnish away from the deployment volume of the airbag body. Further, limiting movement of the jump bracket during a deployment event may ensure that the airbag is directed over the pillar garnish into the occupant compartment of the vehicle.

Directional terms used herein—for example widthwise, lengthwise, vertical, up, down, right, left, front, back, top, bottom, upper, lower—are made only to supply directional context. For example, the terms "extending vertically" or "extending generally vertically" are not meant to exclude a vertically and horizontally extending component.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a pillar garnish mounted at a side pillar assembly of the vehicle, the pillar garnish having an upper end portion;
a roof head lining having an outer portion that extends along the upper end portion of the pillar garnish; and
an airbag jump bracket fixedly located between a pillar body and the roof head lining, the airbag jump bracket including a first portion extending in a vehicle height direction and a second portion extending outwardly from the first portion in a vehicle width direction, the second portion supporting an airbag body that guides the airbag body toward an occupant compartment of the vehicle during an airbag deployment event, the airbag jump bracket further comprising an outwardly turned flange portion extending outwardly in the vehicle width direction to underhang the second portion of the airbag jump bracket, the outwardly turned flange portion and terminating at an end located beneath the second portion of the airbag jump bracket;
the pillar garnish including an airbag jump bracket engaging feature including a tower engaging portion and a ledge engaging portion;
wherein the ledge engaging portion comprises a ledge engaging surface that engages the outwardly turned flange portion with movement of the airbag jump bracket engaging feature in the vehicle height direction and the tower engaging portion comprises a tower engaging surface that engages the outwardly turned flange portion with movement of the airbag jump bracket engaging feature in the vehicle width direction.

2. The vehicle of claim 1, wherein the pillar garnish includes a covering portion and the airbag jump bracket engaging feature is integrally molded with the covering portion.

3. The vehicle of claim 2, wherein the airbag jump bracket engaging feature includes a base portion extending outwardly from the covering portion, the tower engaging portion and the ledge engaging portion extending integrally from the base portion.

4. The vehicle of claim 1 comprising at least two airbag jump bracket engaging features including the tower engaging portion extending upwardly beyond the end of the outwardly turned flange portion of the airbag jump bracket.

5. The vehicle of claim 1, wherein the airbag jump bracket is formed of plastic.

6. The vehicle of claim 1, wherein the airbag body is a curtain shield airbag body.

7. The vehicle of claim 1, wherein the tower engaging portion is spaced from the end of the outwardly turned flange portion no more than about 3 cm.

8. The vehicle of claim 1, wherein the outwardly turned flange portion comprises an underside and the ledge engaging portion is spaced from the underside of the outwardly turned flange portion no more than about 3 cm.

9. A vehicle comprising:
- a pillar garnish mounted at a side pillar assembly of the vehicle, the pillar garnish having an upper end portion;
- a roof head lining having an outer portion that extends along the upper end portion of the pillar garnish; and
- an airbag jump bracket fixedly located between a pillar body and the roof head lining, the airbag jump bracket including a first portion extending in a vehicle height direction and a second portion extending outwardly from the first portion in a vehicle width direction, the second portion supporting an airbag body that guides the airbag body toward an occupant compartment of the vehicle during an airbag deployment event, the airbag jump bracket further comprising an outwardly turned flange portion extending outwardly in the vehicle width direction to underhang the second portion of the airbag jump bracket, the outwardly turned flange portion terminating at an end located beneath the second portion of the airbag jump bracket;
- the pillar garnish including an airbag jump bracket engaging feature having a tower engaging portion spaced from the end of the outwardly turned flange portion no more than about 3 cm and a ledge engaging portion spaced from the outwardly turned flange portion no more than about 3 cm.

10. The vehicle of claim 9, wherein the tower engaging portion is arranged to engage the end of the outwardly turned flange portion of the airbag jump bracket to limit movement of the upper end portion of the pillar garnish into the occupant compartment of the vehicle.

11. The vehicle of claim 9, wherein the ledge engaging portion is arranged to engage an underside of the outwardly turned flange portion of the airbag jump bracket to limit movement of the airbag jump bracket in the vehicle height direction.

12. The vehicle of claim 9, wherein the pillar garnish includes a covering portion and the airbag jump bracket engaging feature is integrally molded with the covering portion.

13. The vehicle of claim 12, wherein the airbag jump bracket engaging feature includes a base portion extending outwardly from the covering portion, the tower engaging portion and the ledge engaging portion extending integrally from the base portion.

14. The vehicle of claim 9 comprising at least two airbag jump bracket engaging features including the tower engaging portion extending upwardly beyond the end of the outwardly turned flange portion of the airbag jump bracket.

15. The vehicle of claim 9, wherein the airbag jump bracket is formed of plastic.

16. The vehicle of claim 9, wherein the airbag body is a curtain shield airbag body.

17. A mounting structure for use with an airbag body in a vehicle, the vehicle including an occupant compartment, a roof side rail and a pillar assembly, wherein the airbag body is inflatable along the roof side rail and across a pillar, the mounting structure comprising:
- a pillar garnish having an upper end portion; and
- an airbag jump bracket including a first portion extending upwardly and a second portion extending outwardly from the first portion, the second portion configured to support the airbag body and guide the airbag body toward the occupant compartment of the vehicle during an airbag deployment event, the airbag jump bracket further comprising an outwardly turned flange portion extending outwardly to underhang the second portion of the airbag jump bracket, the outwardly turned flange portion having an underside and terminating at an end located beneath the second portion of the airbag jump bracket;
- the pillar garnish including an airbag jump bracket engaging feature including a tower engaging portion and a ledge engaging portion;
- wherein the ledge engaging portion comprises a ledge engaging surface that engages the outwardly turned flange portion during the airbag deployment event in a vehicle height direction and the tower engaging portion comprises a tower engaging surface that engages the outwardly turned flange portion during the airbag deployment event in a vehicle widthwise direction to inhibit movement of the pillar garnish during the airbag deployment event.

18. The mounting structure of claim 17, wherein the pillar garnish includes a covering portion and the airbag jump bracket engaging feature is integrally molded with the covering portion.

19. The mounting structure of claim 18, wherein the airbag jump bracket engaging feature includes a base portion extending outwardly from the covering portion, the tower engaging portion and the ledge engaging portion extending integrally from the base portion.

20. The mounting structure of claim 17 comprising at least two airbag jump bracket engaging features including the tower engaging portion.

* * * * *